United States Patent [19]

Kamei et al.

[11] 4,438,468
[45] Mar. 20, 1984

[54] TAPE CASSETTE TRANSFERRING MACHINE

[75] Inventors: Hideaki Kamei, Kyoto; Kazuhiko Yamanaka, Yawata; Haruhiko Fujisawa, Kyoto; Shinichiro Oda, Osaka, all of Japan

[73] Assignee: Hitachi Maxell, Ltd., Osaka, Japan

[21] Appl. No.: 266,389

[22] Filed: May 19, 1981

[30] Foreign Application Priority Data

| May 20, 1980 | [JP] | Japan | 55-69637[U] |
| May 20, 1980 | [JP] | Japan | 55-69638[U] |
| May 20, 1980 | [JP] | Japan | 55-69639[U] |
| May 20, 1980 | [JP] | Japan | 55-69640[U] |

[51] Int. Cl.³ .......................................... G11B 15/68
[52] U.S. Cl. .................................................... 360/92
[58] Field of Search ........................ 360/92, 91, 94, 71

[56] References Cited

U.S. PATENT DOCUMENTS

| 4,071,857 | 1/1978 | Whitney et al. | 360/92 |
| 4,133,013 | 1/1979 | Fisher | 360/92 |
| 4,275,425 | 6/1981 | Watanabe | 360/92 |

*Primary Examiner*—John H. Wolff
*Attorney, Agent, or Firm*—Birch, Stewart, Kolasch & Birch

[57] ABSTRACT

A machine for transferring a plurality of tape cassettes one by one. A magazine container containing a plurality of tape cassettes in an aligned manner is set in a receiving part. The receiving part is reversed for discharging the tape cassettes simultaneously. A cassette transferring mechanism receives the discharged tape cassettes in an aligned condition, transferring the tape cassettes one by one towards a tape treating machine.

9 Claims, 19 Drawing Figures

TAPE CASSETTE TRANSFERRING MACHINE

FIELD OF THE INVENTION

The present invention relates to a cassette transferring machine, and more particularly to a cassette transferring machine which supplies a plurality of cassettes such as tape cassettes consecutively one by one to a tape treating machine.

BACKGROUND OF THE INVENTION

In manufacturing magnetic recording tape cassettes there are used various tape treating machines. One example of a tape treating machine is a magnetic recording tape loading machine wherein a magnetic recording tape is loaded into a tape cassette chamber with both end portions of a roll of a magnetic recording tape fitted with the corresponding leader tapes fixed to the respective hubs already mounted in a tape chamber of the tape cassette. Other examples of tape treating machines are such as a music tape recording machine and a performance test machine.

A tape cassette feeding machine for use in a tape treating machine is described in U.S. Pat. No. 406,286. The tape cassette feeding machine described therein is shown in FIGS. 18 and 19, of the instant application wherein a plurality of tape cassettes 2 to be treated are laid in a lateral attitude and stacked one above the other as shown in FIGS. 18 and 19 in a vertical magazine 120. The vertical magazine 120 is so bent as to provide an arcuate path at the bottom portion thereof whereby the respective tape cassettes 2 move downwardly changing the vertical attitude when passing through the arcuate path. The lowest cassette is taken out from the opening 121 defined in the bottom end of the magazine 120, one at a time.

The tape cassette feeding machine disclosed in the prior art has, however, such drawbacks that each of the cassettes must be placed manually into the path of the magazine 120 from the top opening adjusting the attitude of the cassette, making the system inefficient, preventing from automatic treating of the tape cassettes. A further drawback inherent in the prior art cassette feeding machine is that each of the tape cassettes has to be supplied to the path of the magazine 120 oriented in the same direction, otherwise the magnetic recording tape could not be properly loaded in a cassette chamber. With the top face and the bottom face of the cassette reversed, the magnetic recording tape would be taken up by an undesired hub.

Furthermore, the respective tape cassettes already treated are discharged downwardly with a random attitude, so that they must be collected again reorienting the attitude or must be put in a delivery box for transferring the cassettes to the subsequent process. These steps are also troublesome.

SUMMARY OF THE INVENTION

Therefore, an essential object of the present invention is to provide a tape cassette feeding apparatus which supplies every cassette at a predetermined attitude to a subsequent treating apparatus.

Another object of the present invention is to provide a tape cassette feeding apparatus which provides for the collection of a plurality of tape cassettes in a container with the attitude thereof aligned in one direction so as to facilitate treating of every tape cassette in the subsequent stage.

The other objects and specific features of the tape cassette feeding apparatus according to the present invention will be fully described with reference to the attached drawings.

DETAILED DESCRIPTION OF THE INVENTION

Figure 1:
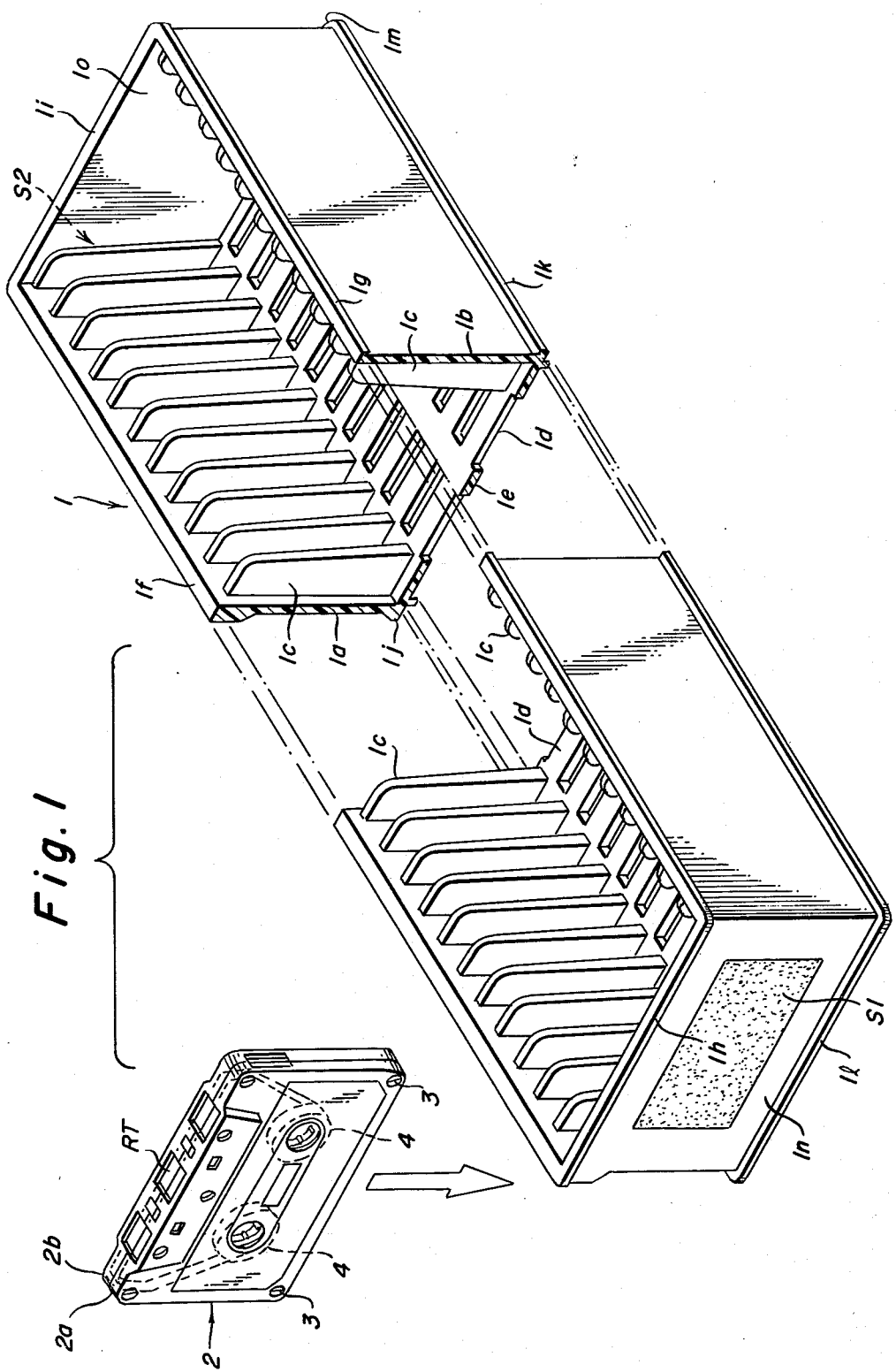
FIG. 1 is a perspective view showing an example of a magazine container used in the cassette transferring machine according to the present invention, with a part thereof cut away.

Referring now to FIG. 1 of the drawings, there is shown a magazine container 1 utilized in the apparatus according to the present invention, which is in the form of a transversely longitudinal rectangular box having an upper opening and a pair of side walls 1a and 1b. Inside the side walls 1a and 1b, there are projectingly provided a plurality of opposite pairs of vertical guide ribs 1c at certain pitches in the longitudinal direction.

The pitch of two adjacent ribs 1c is slightly larger than the thickness of one single tape cassette so that only one cassette can be detachably accommodated in the space between the two adjacent ribs 1c. The lower ends of each opposite pair of the guide ribs 1c are connected with each other by a beam 1d, and a longitudinal beam 1e extends through the centers of the beams 1d. Upper ribs 1f, 1g, 1h and 1i and lower ribs 1j, 1k, 1l and 1m horizontally extend outwardly from the upper and lower peripheries of the magazine container 1 respectively. Particularly, the upper and lower ribs 1f and 1j as shown in the left-hand direction project outwardly with a larger lateral size than that of each of the upper and lower ribs 1g and 1k in the right-hand direction, and the upper rib 1f in the left-hand direction is longer in vertical length than the other ribs so that the magazine container 1 is transversely assymmetrical in its outward configuration.

Furthermore, the outer face S1 of the front wall 1n of the magazine container 1 is formed with a rough face i.e., an aventurine face, while the outer face S2 of the rear face 1o of the container is formed with a smooth face so that an operator can recognize the front face and the rear face by hand.

The tape cassette to be treated by the apparatus of the present invention is substantially formed by a top case 2a and a bottom case 2b made of plastic and assembled together by tapped screws 3, and contains a pair of tape hubs 4 to which both ends of a leader tape are connected with the intermediate portion of the tape being passed through a tape path. The untreated cassettes 2 are inserted into every space between each pair of the guide ribs 1c adjacently provided in the longitudinal direction of the magazine container 1 with the tape travelling surface directed upward. In the embodiment as shown in FIG. 1, about 30 cassettes 2 may be contained in one magazine container 1.

Figure 2:
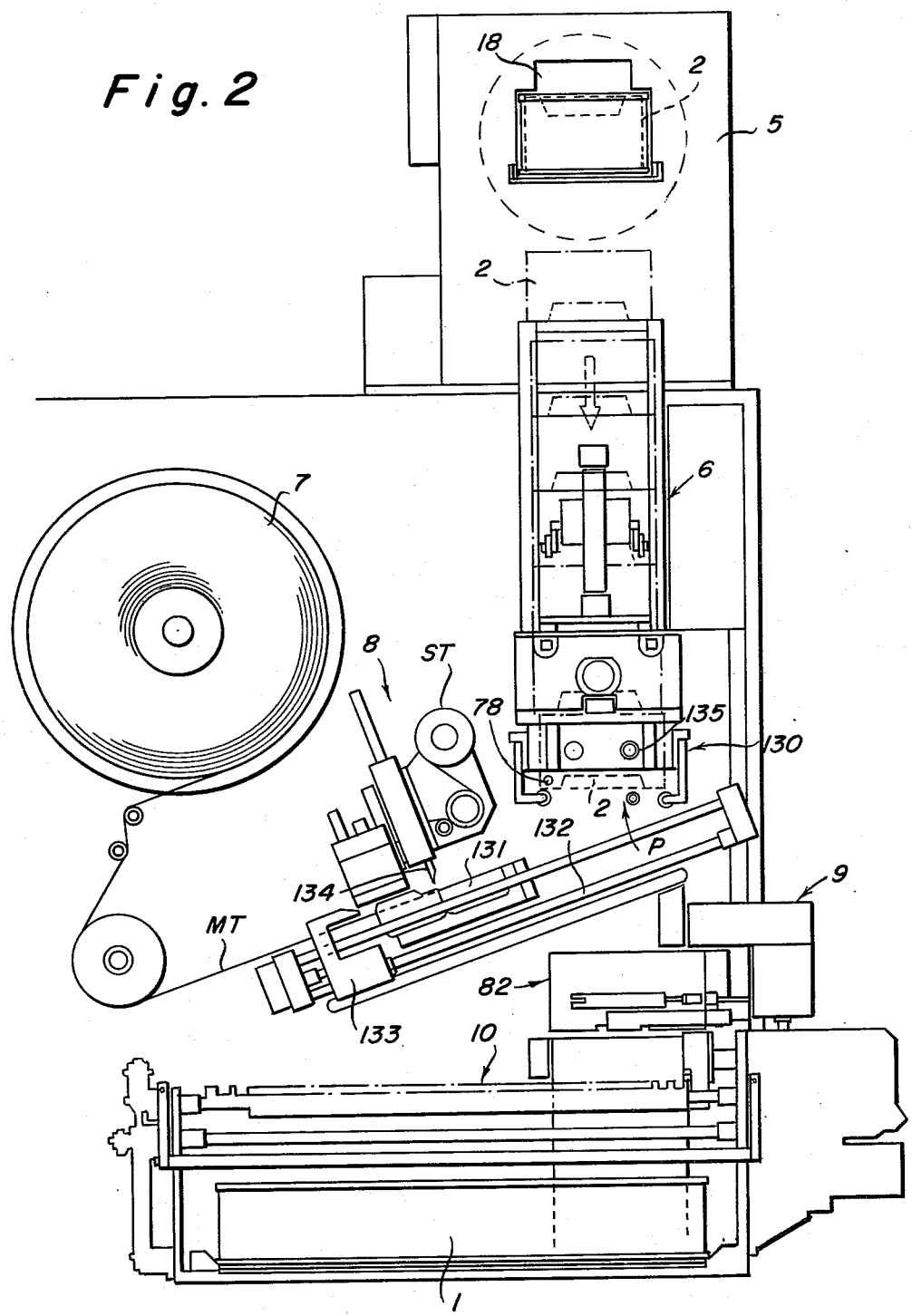
FIG. 2 is a front view showing the general construction of the machine according to the present invention.
Figure 3:
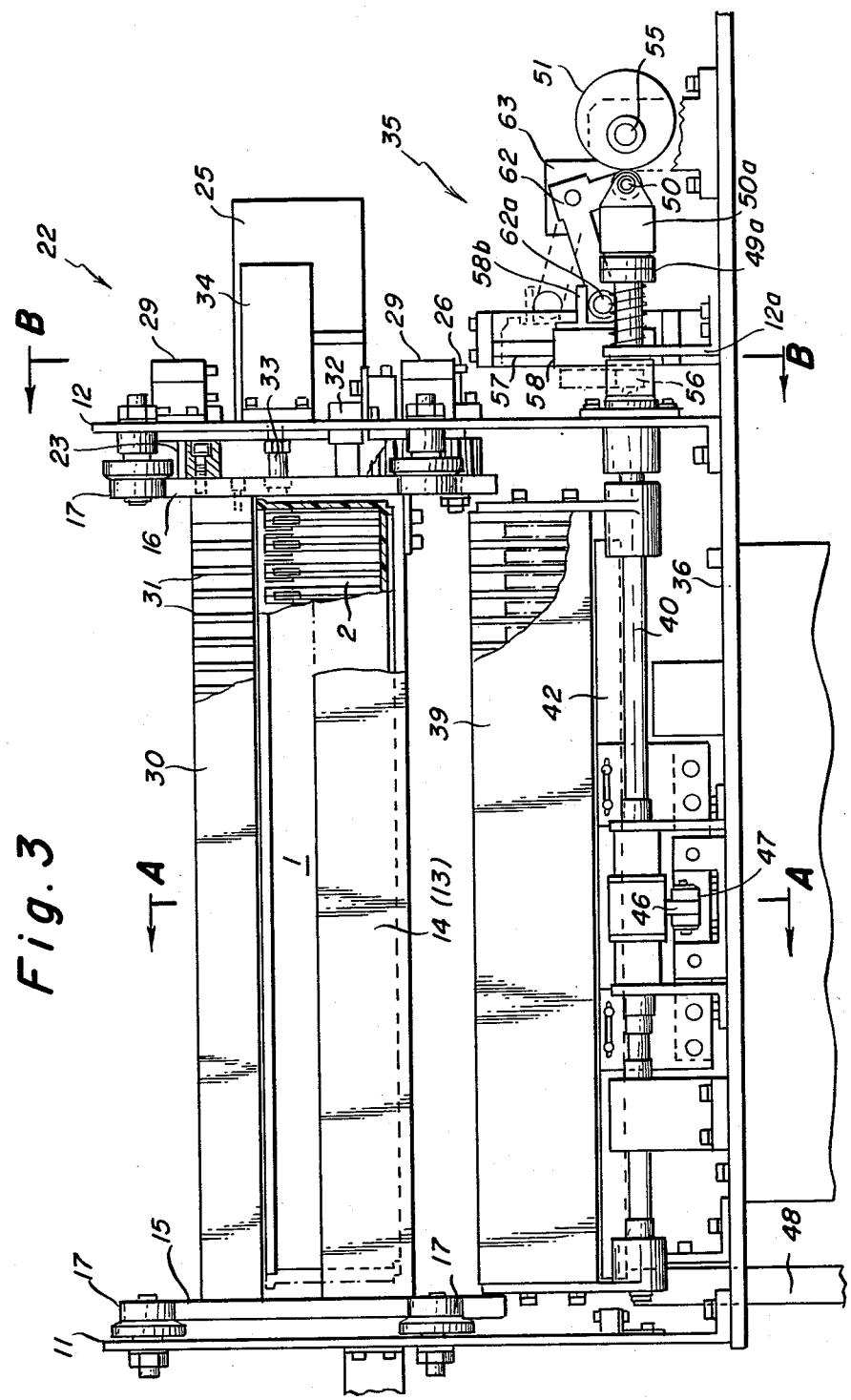
FIG. 3 is a side view showing a first cassette supplying apparatus employed in the cassette transferring machine according to the present invention.
Figure 4:
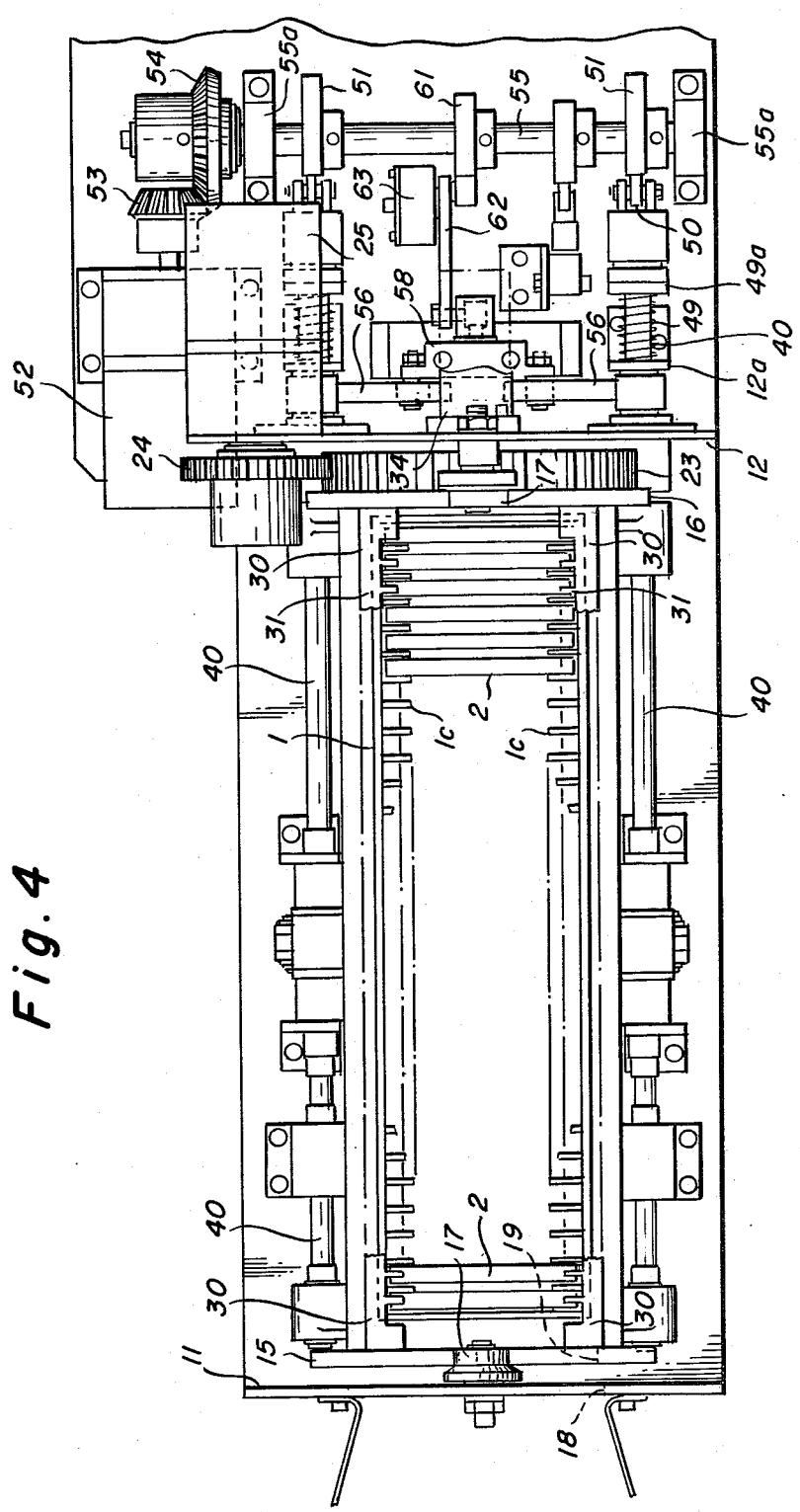
FIG. 4 is a plan view of a magazine container reversing mechanism according to the present invention.

FIG. 2 is a schematic view of the entire body of a cassette treating apparatus used in the present invention, which includes a first cassette supplying apparatus 5 in its upper portion in which the magazine container 1 containing a plurality of tape cassettes 2 is first inserted and then vertically reversed so that each of the tape cassettes 2 is successively fed to the next stage with the tape travelling surfaces of the cassettes 2 directed downward.

The tape cassettes 2 are then fed to a second tape cassette supplying apparatus 6 provided below the first cassette supplying apparatus 5 to be successively forwarded in series along a linear dropping passage of a certain length into a predetermined treating portion.

Below the second cassette supplying apparatus 6, there is provided a tape cassette treating apparatus for treating the appropriately positioned tape cassette 2 by rotating the hubs thereof to examine the efficiency of the magnetic tapes, record information such as music or set magnetic tapes to cassettes provided only with leader tapes.

In the embodiment shown in FIG. 2, the treating apparatus is used to load magnetic tape. The magnetic tape loading apparatus draws out the leader tape RT in the form of a loop from openings in the tape path surface of the cassette 2, severs the center of the loop and successively joins the severed ends of the leader tape RT together with both ends of a magnetic tape MT of a certain length drawn out from a magnetic tape winder 7 to wind the joined tape around one of the tape hubs 4.

The apparatus according to the present invention further includes under the treating apparatus a tape cassette discharging apparatus 9 for receiving the treated casseete 2, turning the same by about 90° in the front side of the body of the apparatus and transferring the same downwardly. Under the tape cassette discharging apparatus 9, there is provided a treated cassette collector 10 which functions to support a number of tape cassettes 2 turned and fed to a certain position transversly in a line and move the cassettes 2 in a lump into a hollow magazine container 1 transversely set thereunder beforehand.

The portions 5, 6, 8, 9 and 10 will hereinafter be described in detail with reference to the drawings.

FIRST CASSETTE SUPPLYING APPARATUS 5

The first cassette supplying apparatus 5 is shown in detail in FIGS. 3 to 7, and comprises a pair of frames 11 and 12 spacedly provided in the longitudinal direction and a pair of disc-shaped wheels 15 and 16 longitudinally provided between the frames 11 and 12 and connected with each other by a pair of transverse stays 13 and 14. The disc-shaped wheels 15 and 16 are supported through guide rollers 17 fixed to the frames 11 and 12 to rotate around the longitudinal axis as indicated by a symbol x. The front frame 11 and the front disc-shaped wheel 15 have openings 18 and 19 respectively for longitudinally treating the magazine container 1 therethrough, and the stays 13 and 14 have guide grooves 20 and 21 (FIG. 6) extending in a longitudinal direction for slidable engaging with the lower ribs 1j and 1k of the magazine container 1 inserted therebetween in the lower ends of the inner surfaces thereof respectively. The guide grooves 20 and 21 have different depths d1 and d2 so that the magazine container 1 is not reversely placed in the longitudinal direction. However, there is still the possibility that the magazine container 1 is forcibly pushed in the first cassette supplying apparatus 5 in the longitudinally reversed condition, and therefore the outer surfaces S1 and S2 of longitudinal side walls 1n and 1o are made course and smooth respectively so that the direction of the magazine container 1 may be found by hand when pushing the same into the first supplying apparatus 5, thereby doubly preventing any error in setting the magazine container 1.

The wheels 15 and 16 hold the magazine container 1 therebetween and vertically rotate to downwardly discharge the cassettes 2 in the magazine container 1 all together. This operation is conducted by a magazine container reversing mechanism 22.

The reversing mechanism 22 comprises a gear 23 in the form of a large-diametrical ring secured to the rear surface of the rear wheel 16, and a pinion 24 which engages with the gear 23 and an electric motor 25 for normally and reversely driving the pinion 24 provided in the rear frame 12. From the rear wheel 16, there backwardly projects a pin 26 (FIGS. 3 and 7) for limiting the angle of rotation of the gear 23 and the rear frame 12 has an arcuate slit 27 defined corresponding to the rotation phase angle of 180° for receiving the pin 26. The pin 26 is to contact with respective stoppers 28 provided on both ends of the slit 27 to limit rotation of the wheel, and the limits of rotation are detected by limit switches 29 operated by the pin 26. Stoppage of reverse driving of the motor 25 is thus controlled by operation of the limit switches 29. Between the wheels 15 and 16, there is further provided a pair of magazine container supporting rods 30 opposite to the upper ends of the transverse side walls 1a and 1b of the magazine container 1 to receive and support the vertically reversed magazine container 1 with the wheels 15 and 16. Within the inner side surfaces of the respective supporting rods 30, there are projected a plurality of opposite pairs of ribs 31 longitudinally in identical pitches with the cassettes 2, and when the magazine container 1 is completely inserted in the predetermined position, each pair of the ribs 31 are oppositely positioned directly upon each cassette 2 when the magazine container 1 is reversed. On the other hand, reversion of the wheels 15 and 16 should be conducted only when the magazine container 1 is completely properly inserted into the first cassette supplying apparatus 5. For this purpose, the rear frame 12 has a limit switch 32 for detecting the position of the rear side wall 1o of the magazine container 1. The rear frame 12 further has a pusher 33 and an air cylinder 34 for longitudinally driving the pusher 33 so that the pusher 33 moves in and out from an opening (not shown) in the rear wheel 16 through the interior of the ring-shaped gear 23. Upon reversion of the magazine container 11, the pusher 33 shifts the same forwardly to a predetermined position so that all of the cassettes 2 in the magazine container 1 are displaced from the ribs 31 and are simultaneously dropped downwardly.

Under the reversing mechanism 22, there is provided a successive cassette dropping mechanism 35 for recieving and supporting the cassettes discharged from the magazine container 1 in a line, progressively forwarding the cassettes 2 and successively feeding the same downwardly.

Figure 5:
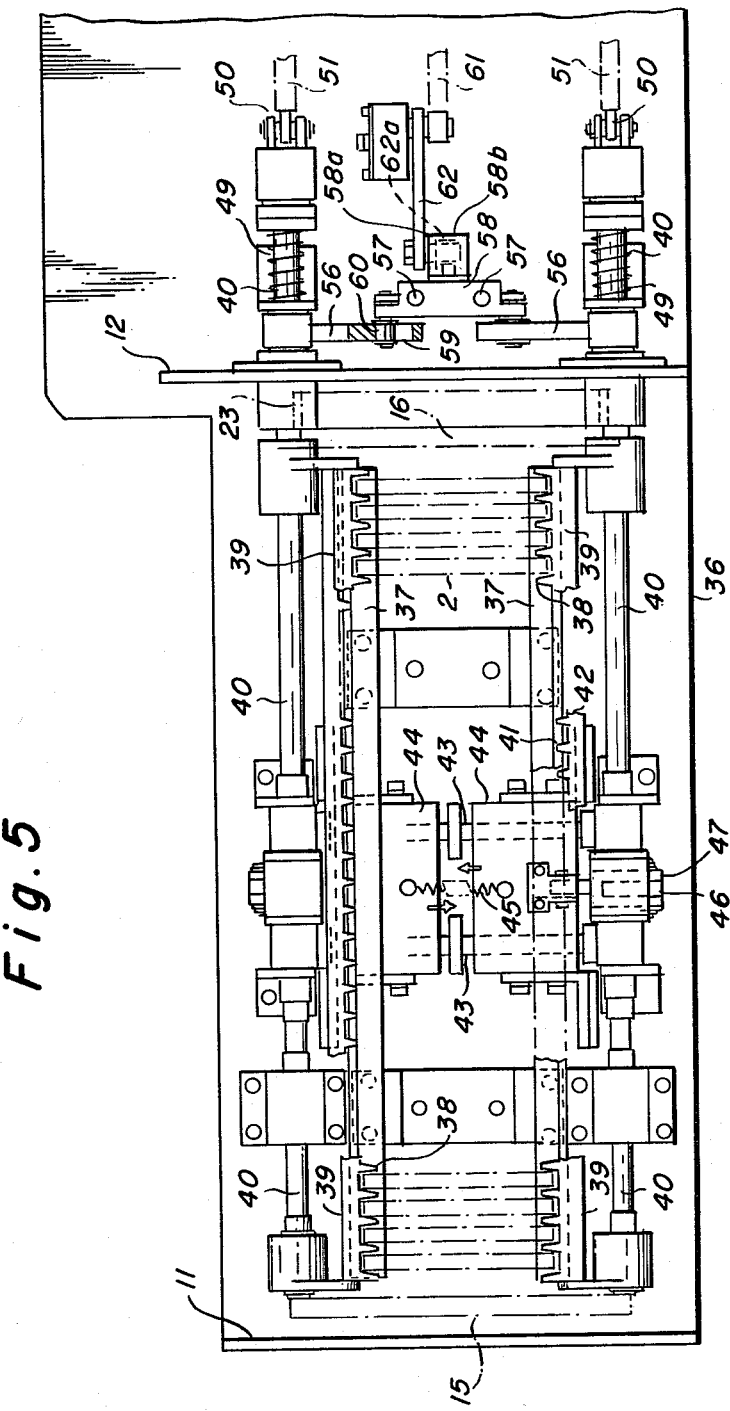
FIG. 5 is a plan view showing a sequential cassette transferring mechanism employed in the cassette transferring machine according to the present invention.
Figure 6:
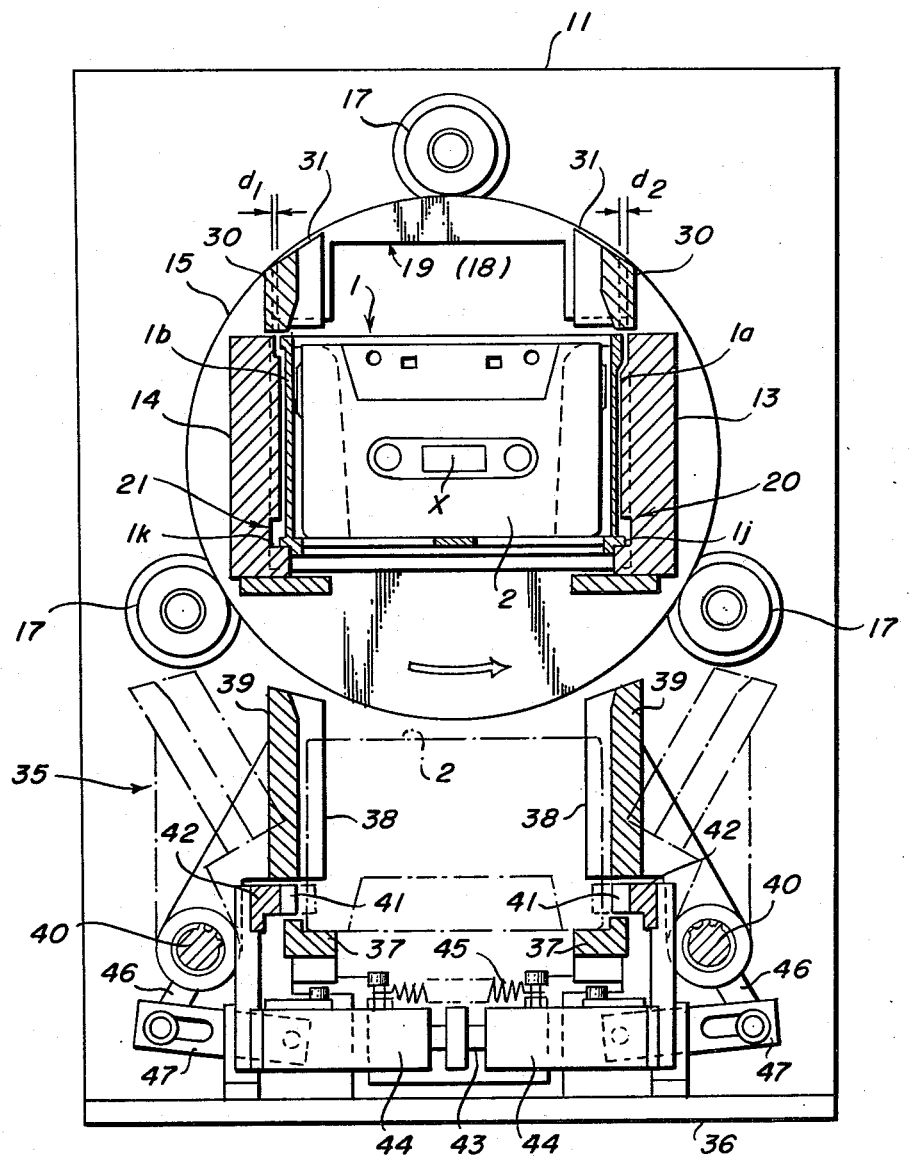
FIG. 6 is a cross sectional view taken along the lines A—A in FIG. 3.
Figure 7:
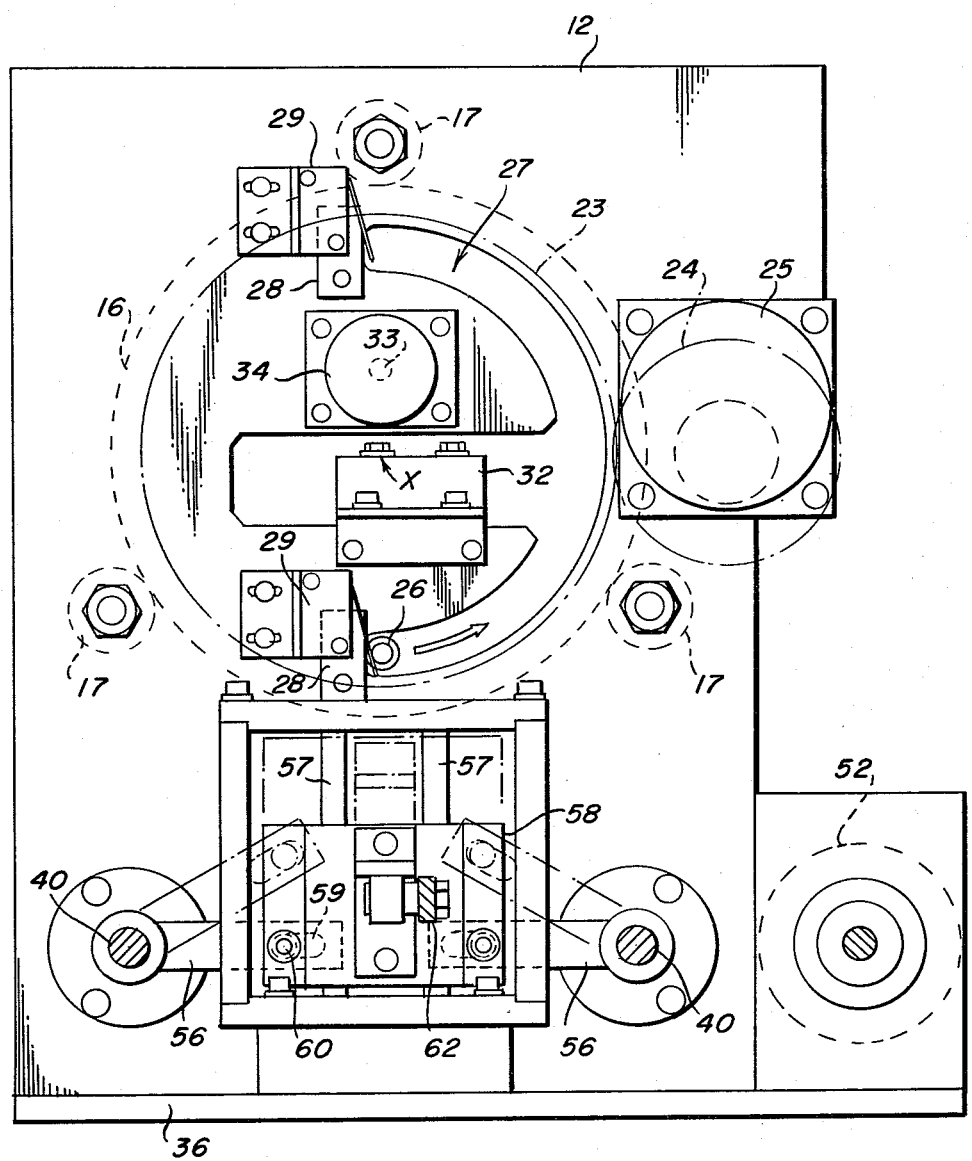
FIG. 7 is a cross sectional view taken along the line B—B in FIG. 3.

The cassette dropping mechnism 35 is shown in detail in FIGS. 5 and 6, and comprises a base frame 36 provided perpendicularly against the longitudinal frames 11 and 12, a transverse pair of horizontal supporting rods 37 secured to the upper portion of the base frame 36 for receiving and supporting the reversed and dropped tape cassettes 2 and a pair of vertically wide feeding rods 39 provided upwardly of the horizontal supporting rods 37 for guiding the dropped tape cassettes 2 in a line at regular intervals by a plurality of pairs of ribs 38. The feeding rods 39 are secured to a pair of rotatable and axially reciprocatable horizontal supporting shafts 40. Between the feeding rods 39 and the supporting rods 37, there are provided a pair of cassette connecting rods 42 having a plurality of ribs 41 which are identical in pitches with the ribs 38. The connecting rods 42 are fixed to movable blocks 44 which are slidable along fixed slide guiding shafts 43 transversely placed on the base frame 36 and are drawn by pressure toward the center by a spring 45. The movable blocks 44 are connected through links 47 with rotatable arms 46 connected in a spline-like manner with the central portions of the supporting shafts 40, and upon rotation of the supporting shafts 40, the feeding rods 39 transversely move and simultaneously the connecting rods 42 linearly move in the opposite direction. Namely, when the cassettes 2 are dropped from above, the feeding rods 39 and the connecting rods 42 are in conditions as indicated by full lines in FIG. 6 and the cassettes 2 are guided by the ribs 38 of the feeding rods 42 to be supported by the supporting rods 37 in line in the longitudinal direction. Subsequently, when the respective supporting shafts 40 are retracted backward in a predetermined length, the ribs 41 support the respective tape cassettes 2 to stand vertically preventing them from falling down. Then the feeding rods 39 are retracted with their opened state as shown in FIG. 6. Upon full retraction of the supporting shafts 40, which are rotated in the reverse direction, the feeding rods 39 are rotated inwardly to stand vertically while the connecting rods 42 are displaced outwardly to the original position for supporting the respective tape cassettes 2 by the ribs 38 of the feeding rods 39.

By repeating the operation as described above, the respective tape cassettes are sequentially forwarded with one pitch at a time resulting in downwardly feeding the leading tape cassette to the guide members 40.

The arrangement for shifting the supporting shafts 40 is explained hereinafter.

Since the construction of the shifting arrangement is identical for each of the supporting shafts, explanation will be made for one supporting shaft.

The supporting shaft 40 is supported rotatably in a cylindrical direction and shifting in a longitudinal direction by the rear frame 12 and an auxiliary fixed member 12a penetrating respectively therethrough.

A coil spring 49 is engaged between the fixed member 12a and a ring member 49a fixed to the rear end of the supporting shaft 40 so that the supporting shaft 40 is normally forced in a backward direction.

A plurality of eccentric circular cams 51 are mounted on the cam shaft 55 which extends laterally on the bed being rotatably supported by bearings 55a, the shaft 55a being driven by the electric motor 52 by the bevel gears 53 and 54.

The cam 51 is slidably engaged with a free roller 50 mounted on a rear end member 50a secured to the rear end portion of the supporting shaft 40 so that when the cam shaft 55 is rotated the large diameter portion of the cam 51 pushes the free roller 50 shifting the supporting shaft 40 frontward against the expanding force of the coil spring 49 and while the smaller diameter portion of the cam engages with the free roller 50, the supporting shaft 40 is reversed to the original position by the expanding force of the coil spring 49, thereby the supporting shaft 40 is reciprocated by a predetermined stroke length upon rotation of the cam 51.

An arm 56 is mounted on the supporting shaft 40 between the rear frame 12 and the fixed member 12a with the inner teeth (not shown) of the arm 56 splined with the teeth of the supporting shaft 40. The free end of the arm 56 is provided with an elongated slot 59 to which the pin 60 is movably inserted to connect the free end portion thereof and the movable block 58 which is moved vertically along the guide axis 57 is secrued to the base frame 36 standing vertically. The movable block 58 has a L shaped engaging member 58a on the rear surface thereof with the horizontal member 58b detachably engaged with the free foller 62a rotatably supported on the free end of a L shaped link 62. The link 62 is pivotally supported on a standard 63 around the axis 62a to be rotated in the vertical plane. The other end of the link 62 to rotatably engaged with the eccentric cam 61 which is supported on the cam shaft 55 so that upon rotation of the cam 61, the link 62 is swung in the vertical plane with a predetermined angle, thereby causing the movable block 58 to be reciprocated vertically resulting in swinging both of the arms 56 to rotate reciprocally the supporting shafts 40 with a predetermined angle.

SECOND CASSETTE TRANSFERRING APPARATUS 6

Figure 8:
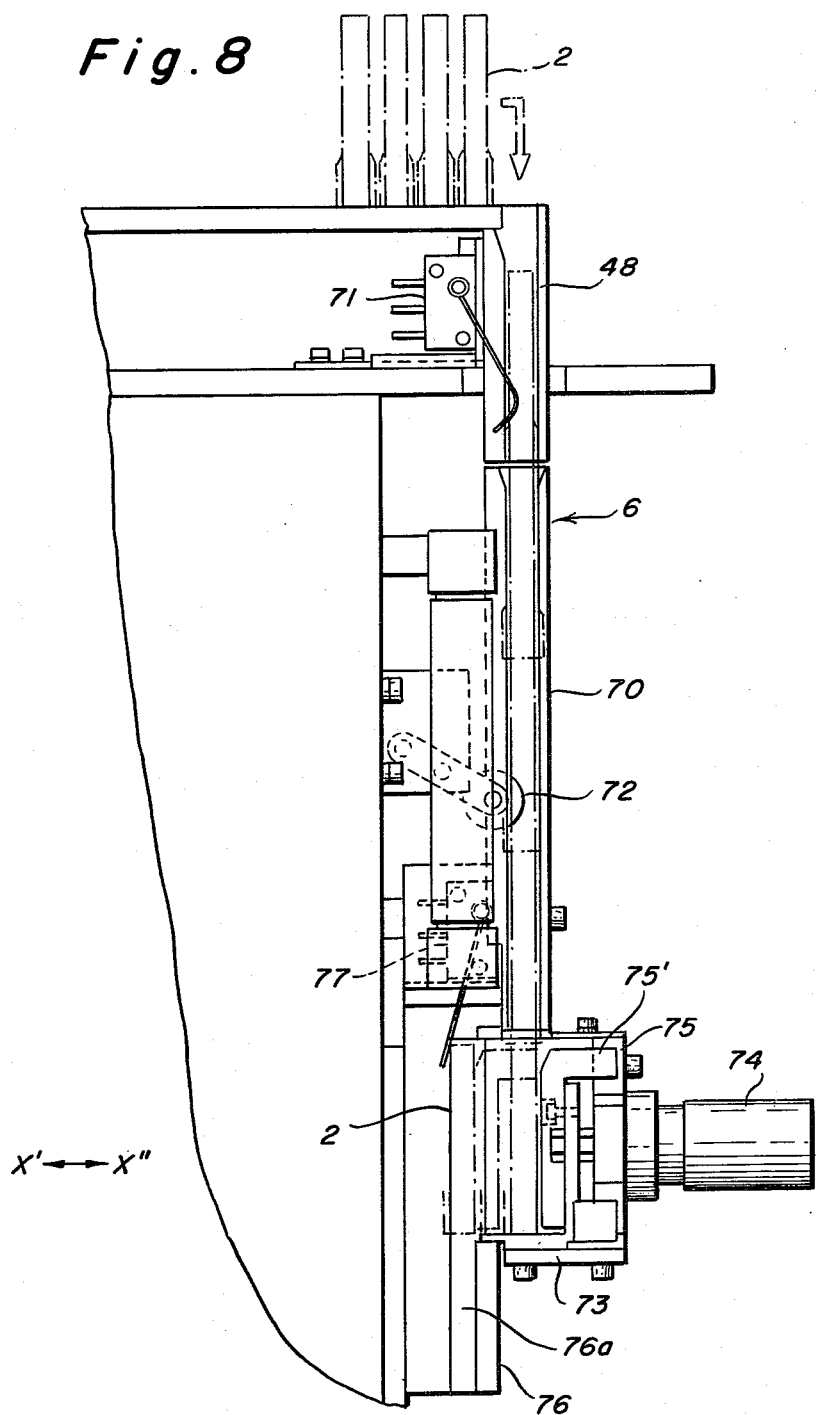
FIG. 8 is a side view showing a second cassette supplying apparatus employed in the cassette transferring machine according to the present invention.
Figure 9:
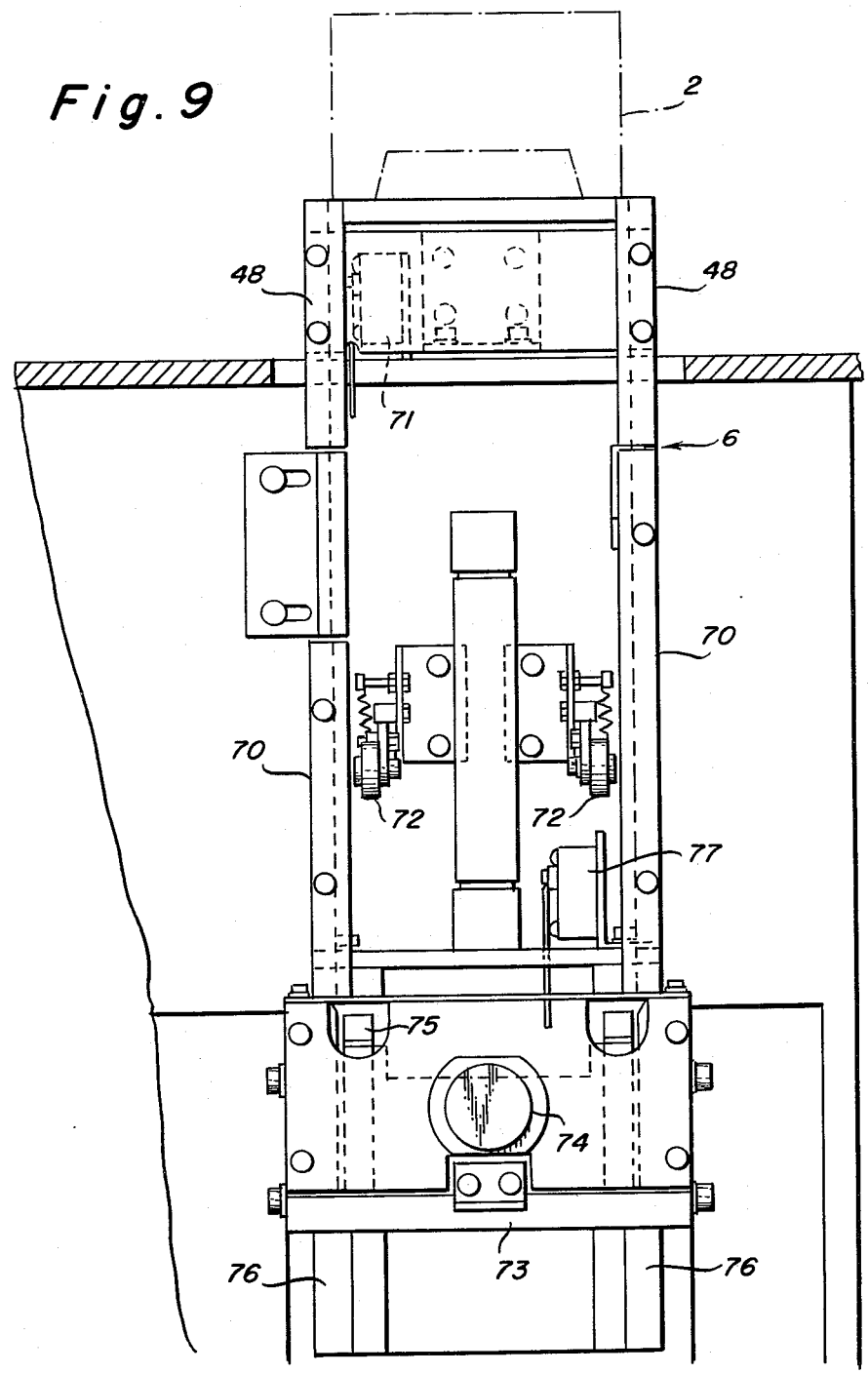
FIG. 9 is a front view of the apparatus shown in FIG. 8.
Figure 19:
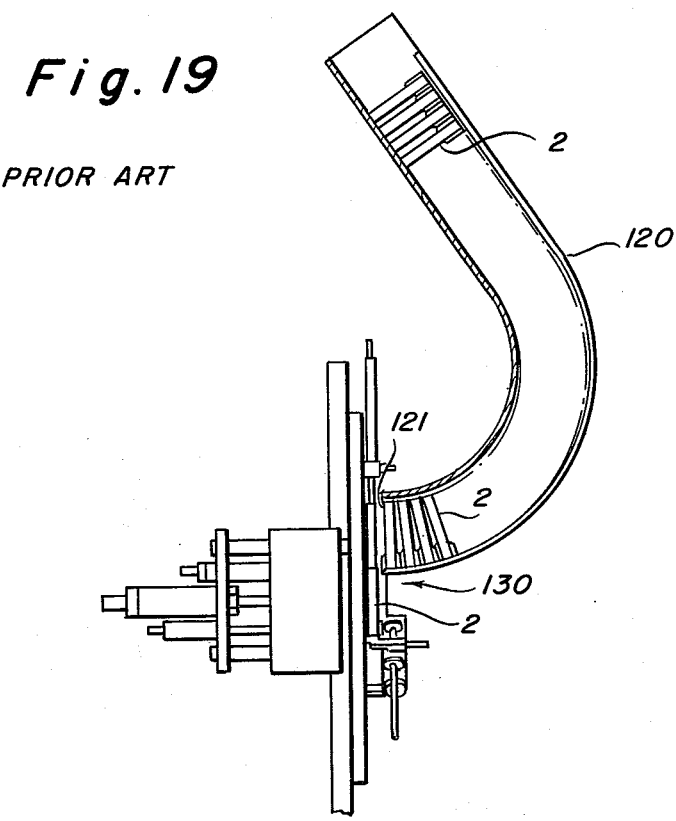
FIG. 19 is a vertical cross sectional view of the machine shown in FIG. 18.
Figure 10:
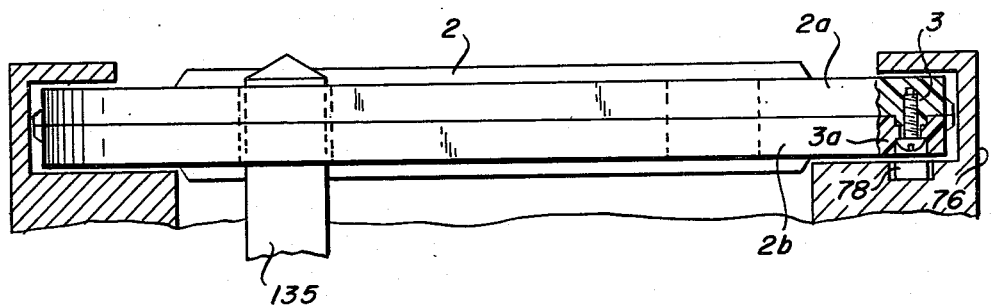
FIG. 10 is a cross sectional view showing an arrangement of a proximity switch employed to detect the surface of a tape cassette.

Referring now to FIGS. 8 and 9, each of uppermost or first guide members 48 has a length for accommodating one tape cassette 2 with the short side of the cassette directed vertically. Below the first guide members 48 there are provided a pair of lower or second guide members 70 for retaining a plurality of tape cassettes 2 with the vertical attitude and lined up one above the other. In the embodiment shown in FIG. 8, three tape cassettes can be retained in the lower guide members 70. A limit switch 71 is provided on the upper guide members 48 for detecting the presence of the tape cassette 2 between the upper guide members 48. Between the lower guide members 70, there are provided a pair of braking rollers 72 which are adapted to contact resiliently to the surface of the tape cassette moved downwardly along the second guide members 70 so that the rollers 72 give a braking force on the tape cassette to slow the dropping speed of the tape cassette 2.

In order to receive the respective tape cassettes dropping through the second guide members 70, a reception take up frame 73 is located just below the lower guide members 72. A pusher 75 is provided opposing the take up frame 73 for displacing the tape cassette 2 by means of a pusher member 75' which is moved by an air cylinder 74 in a direction as shown by the arrow marks x'-X" in FIG. 8. It is noted that X as a" is defined as a frontward direction and X' backward direction. When the pusher member 75' is retracted as shown by the real line in FIG. 8, the bottom of the second guide members 70 is opened to allow the tape cassette 2 to drop out of the second guide members 70, on the other hand, when the pusher member 75' is in the projected position, the bottom of the lower guide members 70 is closed by the top surface of the pusher member 75' to support the tape cassette 2 which remains in the guide members 70, while the tape cassette 2, which already dropped from the guide members 70, is displaced frontwardly and being thrown into a vertical path 76a defined by the pair of third guide members 76 to transfer the tape cassette 2 in a downward direction to the subsequent stage exhibiting a vertical attitude of the tape cassette. A limit switch 77 detects presence or absence of the tape cassette 2 in the take up frame 73.

A CASSETTE TREATING APPARATUS 8

Figure 18:
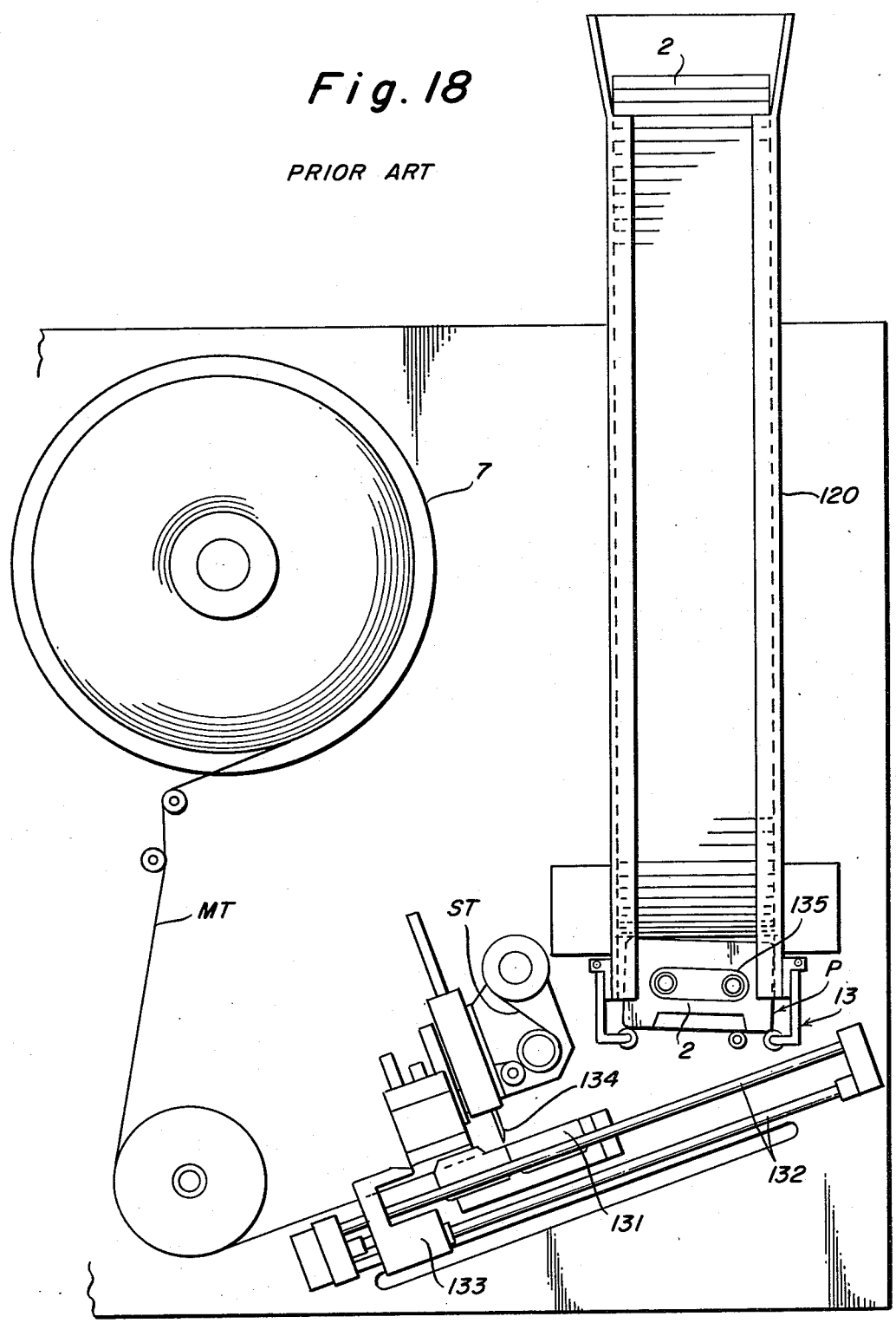
FIG. 18 is a front view of a cassette transferring machine of the prior art.

Referring to FIG. 2 and FIG. 18, a slider 133 serves to take a leader tape RT out of the tape cassette 2 by attracting the leader tape RT onto the top face of the slider 133 by vacume in turn the slider 133 is moved leftward to retract the leader tape RT from the tape cassette, so that the end of the leader tape RT is brought to a bonding block 131, where the leader tape RT is cut by the cutter 134 then the end of the leader tape RT is bonded with an end of the magnetic recording tape MT released from the original roll 7 of the magnetic recording tape by means of a splicing tape ST. Subsequently the magnetic recording tape is taken up by the right side hub of the tape cassette 2 which is driven by a drive shaft 135 mounted on the apparatus 6. When the magnetic recording tape is wound on the right side hub by a predetermined volume, the corresponding end of the magnetic recording tape RT is cut by the cutter 134 with its end bonded with the end of the leader tape RT attached to the left side hub in the tape cassette 2 by means of a splicing tape ST.

Subsequently, the right side hub is again driven to complete taking up the magnetic recording tape MT.

In order to take up the magnetic recording tape on one predetermined hub, in every tape cassette during the tape take up process as described before, there is provided a proximity switch 78 in a position where a metal screw 3a is fixed to the tape cassette when the cassette 2 is loaded on the cassette treating apparatus 8 so that the proximity switch 78 detects the attitude of the cassette i.e., every tape cassette is mounted on the apparatus 8 with its predetermined surface, for example, the A surface directed frontward by sensing presence or absence of the metal screw 3a.

By this arrangement, in a case where a tape cassette is loaded on the cassette treating apparatus 8 with its face reversed, such reversed tape cassette is discharged from the treating apparatus without any treatment in the apparatus in response to the signal of the proximity switch 78.

The purpose of detection of the cassette attitude as explained above is mentioned below. It is noted that in loading the recording tape in every tape cassette, length of each of the leader tapes connected with both ends of the recording tape must be the same. To the contrary, since the leader tape is derived from the tape cassette at the right side position in FIG. 2, if the tape cassette is loaded on the treating apparatus 8 with the surface reversed, there may occur difference in length between each of the leader tapes connected with the left end of the recording tape and the other leader tape connected with the right end of the recording tape.

According to the apparatus as explained above, since the process of bonding of the leader tape to the recording tape is performed only on the tape cassettes loaded with correct attitude, the length of each of the leader tapes can be the same.

According to the present invention, tape cassettes having one of the following states are also discharged without any treatment:

(a) a case where the length of the leader tape is too short, (b) a case where the leader tape RT is unduly clamped in the gap of the top case 2a and the bottom case 2b when the both cases are fastened together by the tapping screws 3a, and (c) in a case where the leader tape is jammed in the tape cassette.

TREATED CASSETTE DISCHARGING APPARATUS 9

Figure 11:
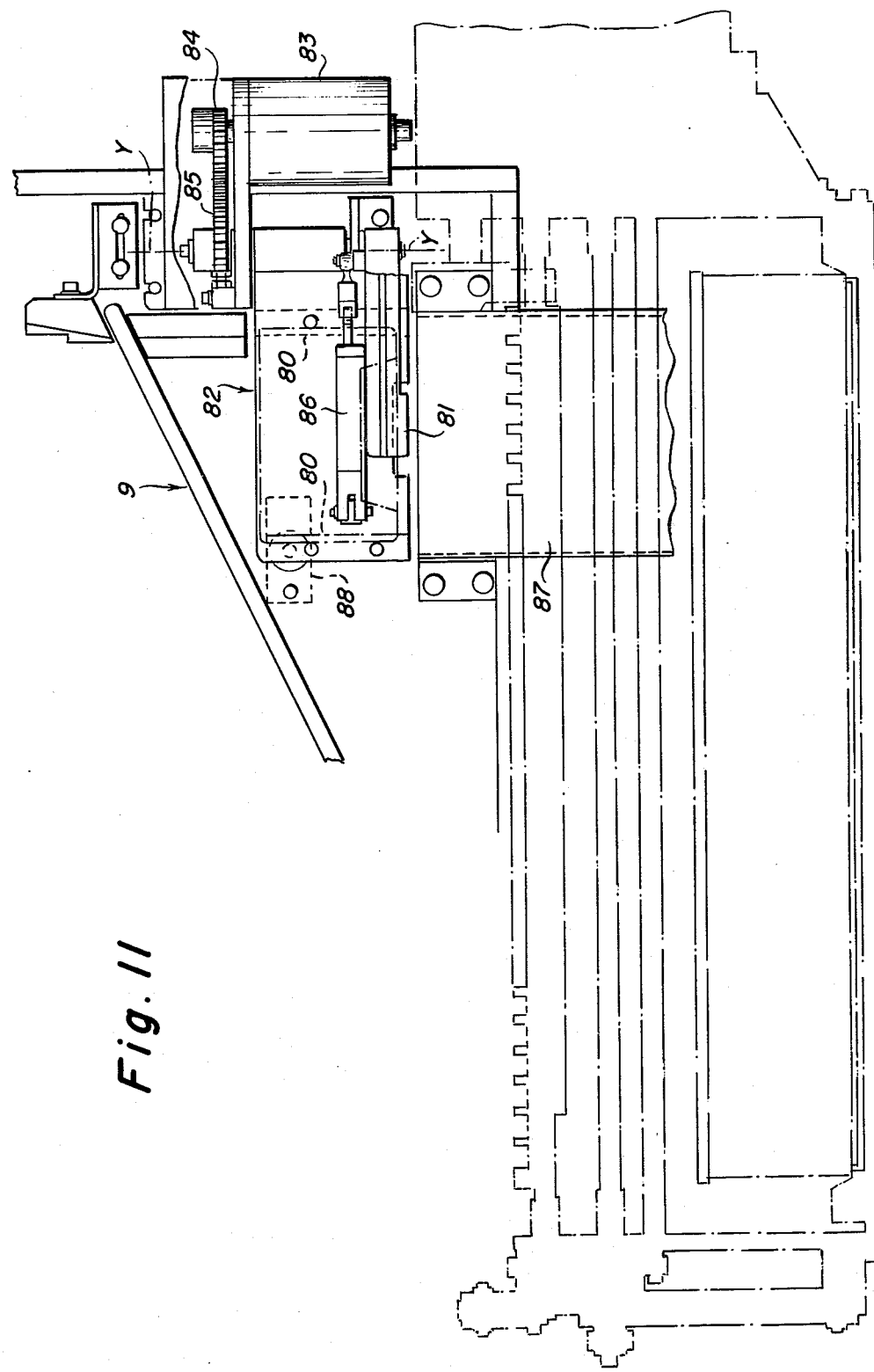
FIG. 11 is a front view showing a cassette discharging apparatus employed in the machine according to the present invention.
Figure 12:
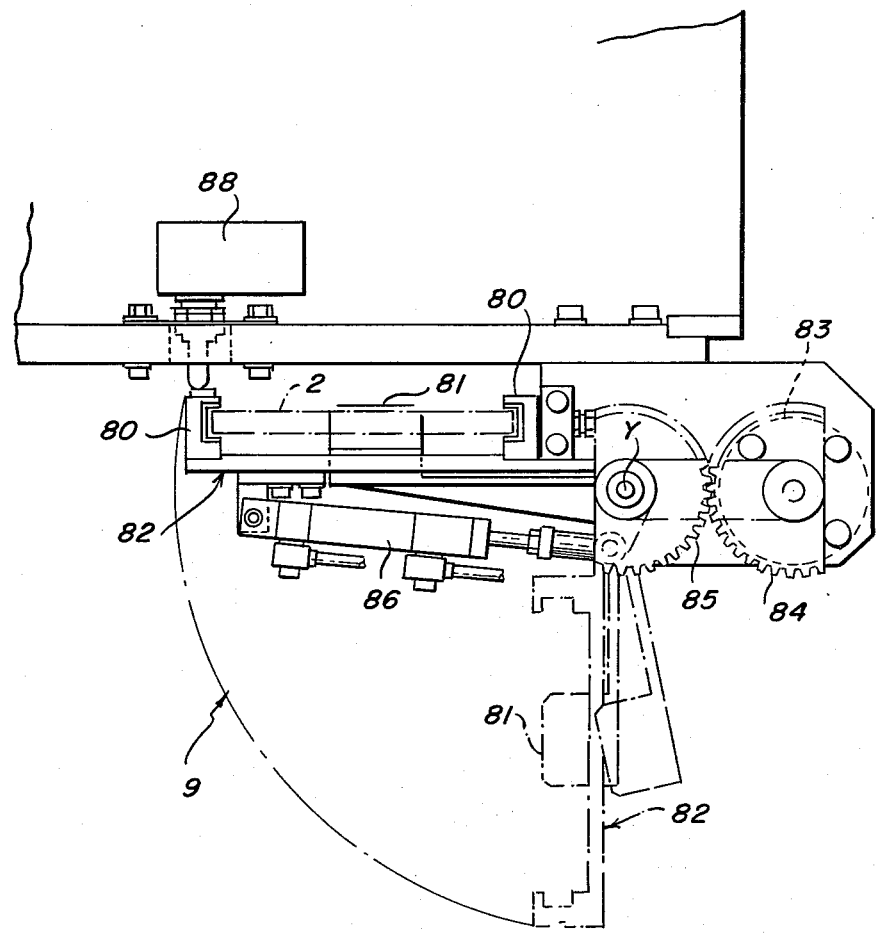
FIG. 12 is a plan view of the cassette discharging apparatus shown in FIG. 11.
Figure 13:
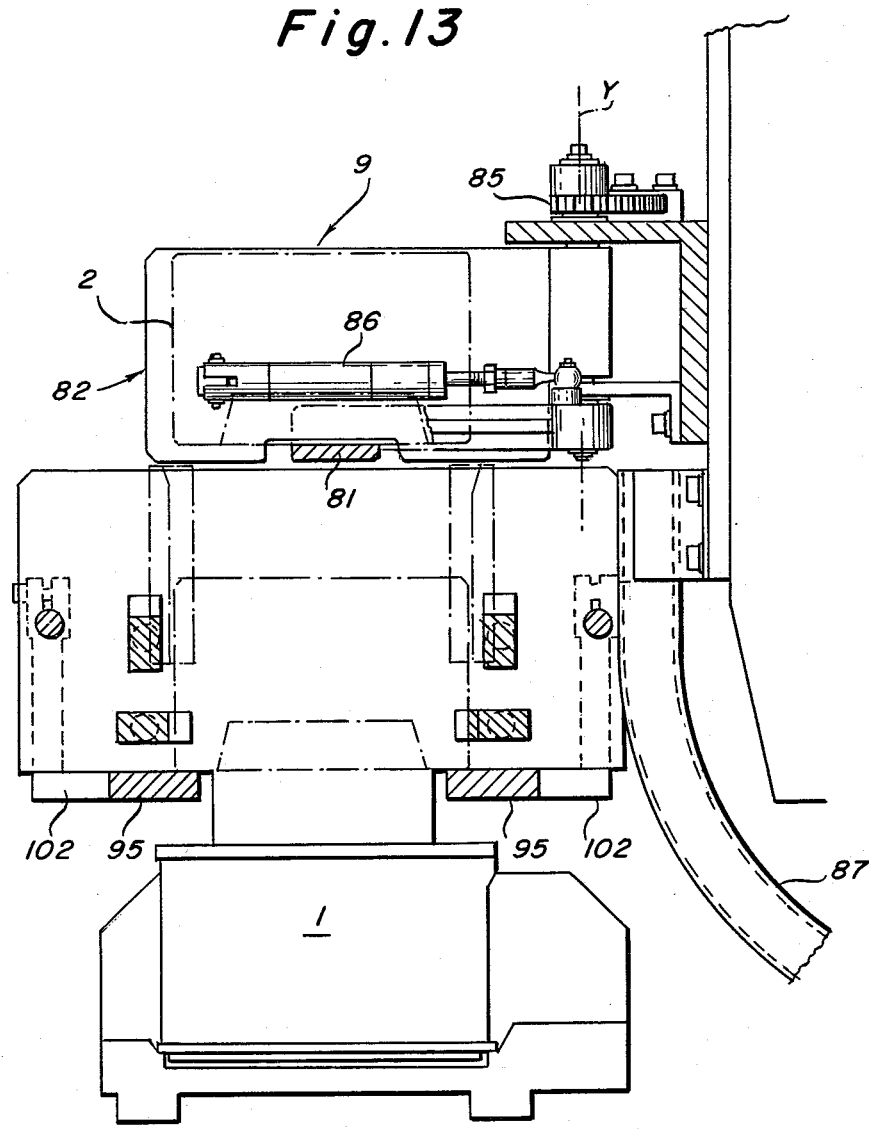
FIG. 13 is a vertical cross sectional view of the cassette discharging apparatus shown in FIG. 11.
Figure 14:
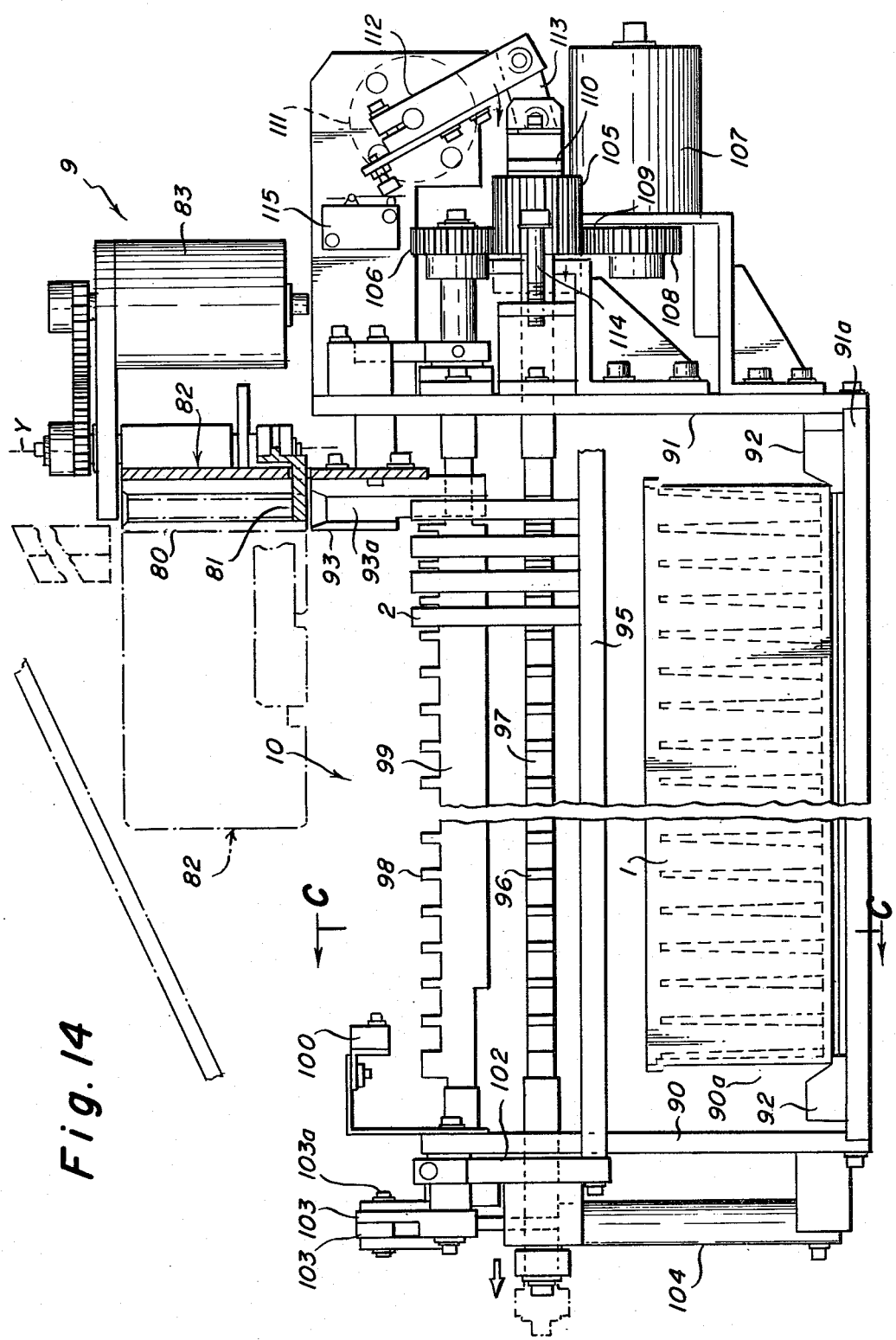
FIG. 14 is a front view showing a cassette recovering apparatus employed in the cassette transferring machine according to the present invention.
Figure 15:
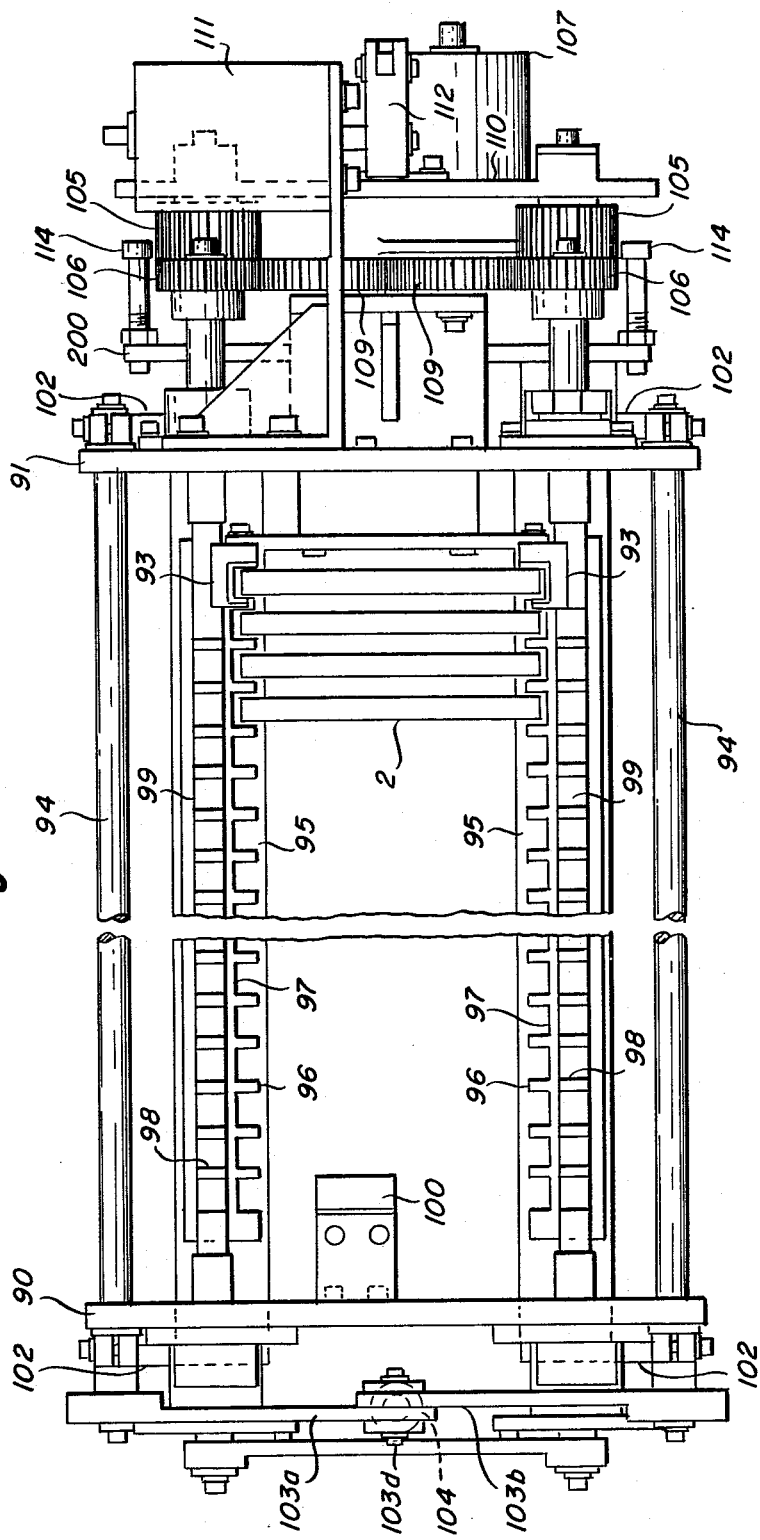
FIG. 15 is a plan view showing the cassette recovering apparatus shown in FIG. 14.
Figure 16:
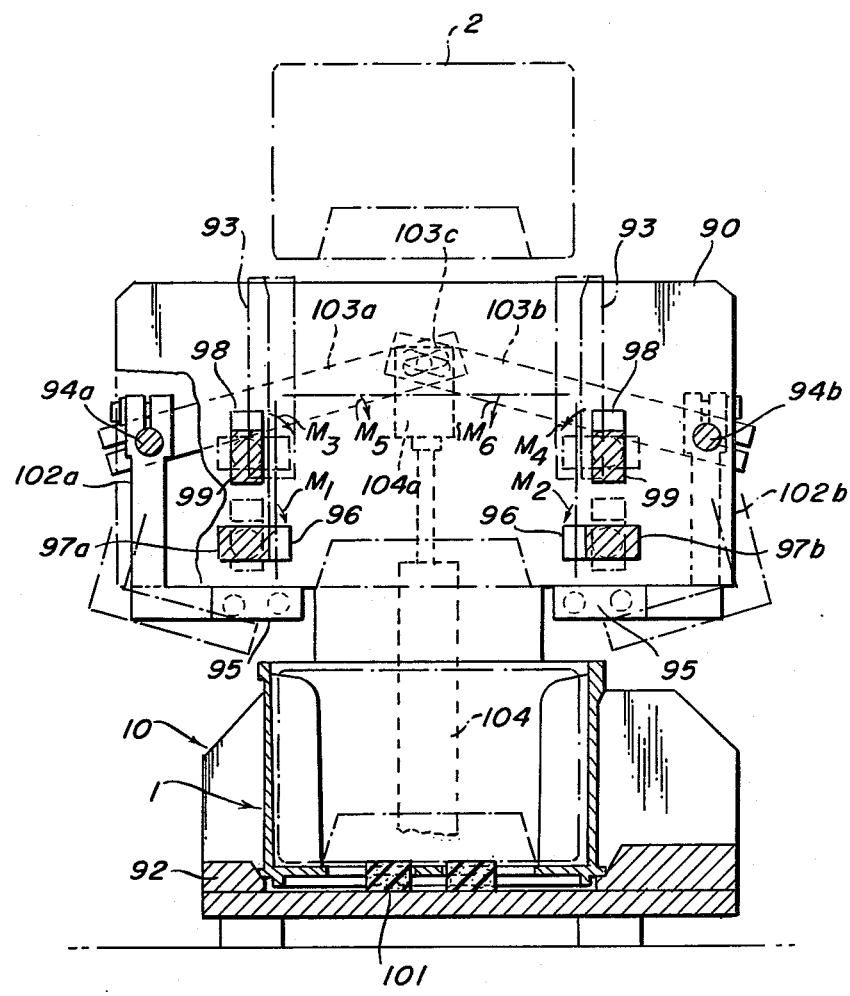
FIG. 16 is a cross sectional view taken along the line C—C in FIG. 14.
Figure 17:
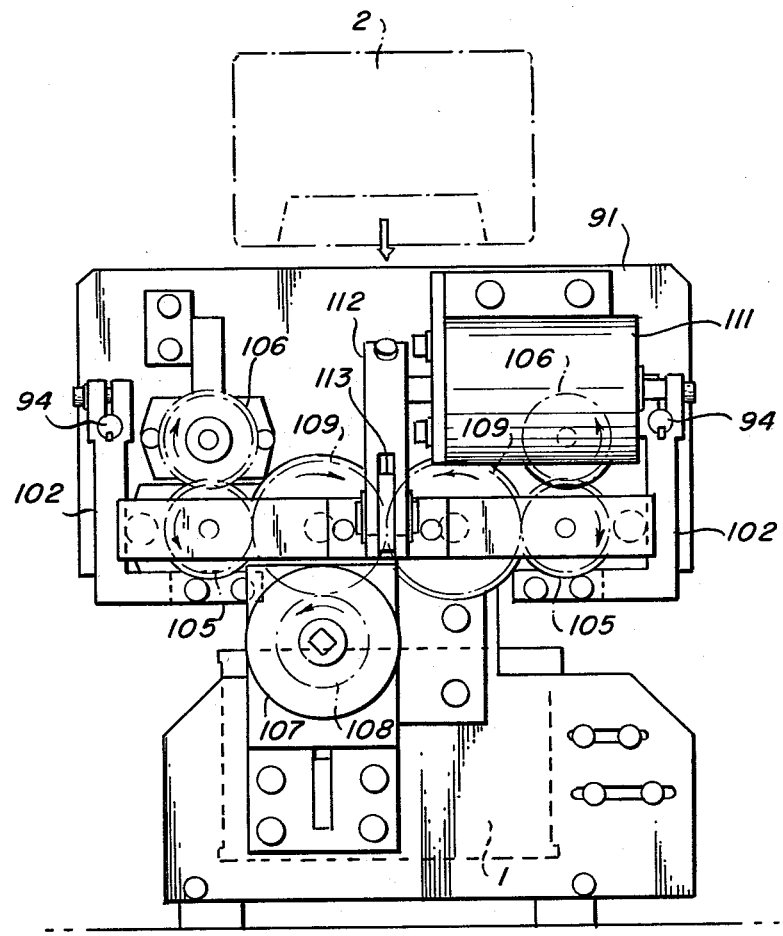
FIG. 17 is a side view showing the cassette recovering apparatus shown in FIG. 14.

Referring to FIGS. 11 to 13, a tape cassette 2 already treated in the apparatus 8 is discharged downwardly, being received by a carrier 82 having a pair of horizontally elongated guides 80 and a stopper 81 located at the front end of the guides 80.

The carrier 82 is driven by means of a reversible electric motor 83 through a pair of engaged gears 84 and 85, so that the carrier 82 is rotated in both directions around a vertical axis Y at an angle of about 90°. A stopper 81 is situated horizontally below the guides 80 with a rotatable manner by means of an air cylinder 86 around the vertical axis Y.

When the wrong cassette is fed from above, the air cylinder 86 is in a retracted position so that the stopper 81 is rotated to a position to open the bottom of the carrier 82, from which the wrong tape cassette is dropped to the wrong cassette collector 87. To the contrary, when the correct tape cassette is fed to the carrier 82, the air cylinder 86 is so expanded that the stopper 81 closes the bottom of the carrier 82 whereby the tape cassette is retained in the carrier 82. Subsequently, the motor 83 starts to rotate in a clockwise direction, resulting in rotation of the gear 85 in a anticlockwise direction with the carrier 80 and the stopper 81 retaining the tape cassette 2 therein rotated 90° as shown by the chain lines in FIG. 12, then the carrier 80 with the tape cassette 2 is reached just above the recovering apparatus 10. When the carrier 82 is reached above the recovering apparatus 10, the air cylinder 86 is retracted so that the stopper 81 opens the bottom of the carrier 80 to allow the tape cassette 2 to drop from the opening of the bottom of the carrier 82 to discharge the tape cassette 2 in the recovering apparatus 10 with its attitude standing along side thereof directed laterally. After the tape cassette 2 is taken out of the carrier 82, the air cylinder 86 is expanded to close the bottom of the carrier 80 and the electric motor 83 is reversed to retract the carrier 82 to the original position where the latter 82 faces the guides 80.

RECOVERING APPARATUS 10

Referring to FIGS. 14 to 17, there are provided a pair of frames 90 and 91 below the discharging device 9. In the compartment 90a defined by the frames 90, and 91, a magazine container 1 is horizontally set in position defined by a pair of guide blocks 92 situated on the bottom plate 91a.

A guide member 93 is secured adjacent to the top portion of the right side frame 91 for receiving each of the tape cassettes 2 supplied from the discharging device 9 in a vertical slot 93a to move the tape cassette 2 downwardly one at a time in a vertical attitude. Each of the cassettes 2 thus dropped is received by a pair of supporting rods 95 extending laterally and being movable reciprocally by a pair of supporting shafts 94 as hereinafter described.

Above the supporting rods 95, there are laid a pair of cassette feeding rods 97 having a plurality of vertical ribs 96 formed thereon with a predetermined pitch so that each of the tape cassettes is inserted in the respective slots defined by the vertical ribs 96. The cassette feeding rods 97 are moved reciprocally laterally by corresponding drive members 112 each of which is swung by an electric motor 111. The cassette feeding rods 97 are adapted to rotate in opposite directions around their longitudinal axes at an angle of 90° as shown in the dotted lines in FIG. 16 with each of the ribs 96 standing vertically so that the ribs 96 can release the respective tape cassettes.

Furthermore, above the cassette feeding rods, there are bridged a pair of engaging rods 99 laying parallel with the corresponding feeding rods 97. The engaging rods 99 are respectively only rotatable around their axes and having a plurality of ribs 98 with the same pitch as that of the ribs 96 and each of the ribs 98 is opposed to each of the ribs 96 of the feeding rods 97 when the feeding rods 97 are in the retracted position. By this arrangement, when one tape cassette is dropped from the discharging device 9 each of the ribs 98 of the supporting rods 99 is directed upwardly so as to pass the dropped cassette to the feeding rods 97, each of the ribs 96 which is directed horizontally to receive the tape cassette thus dropped in the slot formed by the rightmost and the second rightmost ribs of the feeding rods. When the subsequent tape cassette is dropped from the discharging device 9 the cassette feeding rods 97 are shifted leftward by one pitch by the swing motion of the drive member 112 with the ribs 96 directed horizontally, thus the first tape cassette 2 is shifted leftward by a predetermined pitch defined by the rotational angle of the drive member 112. After the one stroke of the feeding rods is completed, the electric motor 107 is driven to rotate the feeding rods 97 outwardly as shown by the arrow marks M1 and M2 in FIG. 16, thereby causing the ribs 96 of the feeding rods 97 to be directed upward resulting in releasing of the tape cassette. On the other hand, in synchronism with the rotation of the feeding rods 97, the engaging rods 99 are rotated inwardly as shown by the arrow marks M3 and M4 in FIG. 16 by the rotation of the electric motor 107 through the gears 106, thereby causing the ribs 98 of the engaging rods 99 to be directed in the horizontal direction so as to clamp the tape cassette thus shifted and standing vertically and in turn the feeding rods 97 are shifted rightward or retracted to the original position by the rotation of the drive member 112. When the feeding rods 97 are retracted to the original position, the electric motor 107 is rotated in a reversed direction so that the feeding rods 97 and the engaging rods 99 are respectively rotated in the rearward direction, thereby causing the ribs 96 of the feeding rods 97 to be directed horizontally and the ribs 98 of the engaging rods 99 to be directed upward so as to receive the subsequent tape cassette fed from the discharging device 9.

The process as mentioned above is repeated every time when one tape cassette is fed to the recovering device 10 from the discharging device 9, whereby a plurality of cassettes are transferred sequentially leftward with each of the tape cassettes being retained standing vertically parallel in the same attitude i.e., the same surface of every tape cassette for example, the A surface, being oriented in the same direction.

When the leading tape cassette in the feeding rods 97 reaches the leftmost end, namely all of the slots in the feeding rods 97 are filled with the tape cassettes, the leading tape cassette is detected by the photo sensor 100.

In response to the detecting signal of the photo sensor 100, the air cylinder 104 is retracted to rotate the respective links 103 downwardly as shown by the arrow marks M5 and M6 around the both of the supporting shafts 94a and 94b. Thus, the left supporting shaft 94a is rotated clockwise direction and the right supporting shaft 94b anti-clockwise so that the respective L shaped arms 102a and 102b swing outwardly to release the tape cassettes from the supporting rods 95, thereby allowing all of the tape cassettes loaded on the feeding rods 97 to be dropped simultaneously on the magazine container 1 located just below the supporting rods 95 with the rods 1a of the magazine container 1 to be aligned with the corresponding ribs 96 of the cassette feeding rods 97. Thus, the respective tape cassettes dropped are accommodated in the magazine container 1 each standing vertically and parallely with the same surface of the every cassette directed to the same direction. A plurality of cushioning members 101 projected from the base of the apparatus 10 passing through the bottom portion of the magazine container 1 facilitates a soft loading of the tape cassette in the magazine container 1 without giving any undesired shock to the respective tape cassettes when the lower ends thereof abuts the upper surface of the bottom of the container 1.

After all of the tape cassettes are recovered in the magazine container 1 as described above, the air cylinder 104 is projected upward so that the respective links 103 are rotated upward around the supporting shafts 94a and 94b, then the supporting shaft 94a is rotated anti-clockwise and the supporting shaft 94b clockwise, causing the L shaped arms 102a and 102b to be rotated inwardly so that the respective supporting rods 95 are placed below the cassette feeding rods 97 to receive the tape cassettes dropped from the discharging device as hereinbefore described.

A detailed construction of the arrangement of the cassette discharging apparatus will be described hereinafter.

The respective ends of both of the supporting rods 95 are fixed with the corresponding L shaped arms 102a and 102b secured to both end portions of both of the supporting shafts 94a and 94b rotatably supported by the front wall 90 and the rear wall 91 with the supporting shafts 94a and 94b being penetrated therethrough. In the front end portions of both of the supporting shafts 94, the respective links 103a and 103b are secured and the free ends of both of the links 103a and 103b are movably linked together by a pin 103d passed through the respective elongated holes 103c. The pin 103a is also rotatably linked with the top end of the piston 104a of the air cylinder 104 so that both of the links 103a and 103b are rotated in the opposite direction relative to the both of the supporting shafts 94a and 94b. By this arrangement, upon vertical movement of the piston 104a of the air cylinder 104, the supporting rods 95a and 95b are swung in opposite directions so that the supporting rods 95a and 95b come to the area below the both of the cassette feeding rods 97 or leave the area to allow to drop the respective tape cassettes supporting on the supporting rods 95a and 95b.

The cassette feeding rods 97 are provided with the gears 105 at the rear end portion thereof and the engaging rods 99 are also provided with the gears 106. The gears 105 and 106 are engaged together so that upon rotation of the gear 105 the feeding rod 97 and the engaging rod 99 are rotated in an opposite direction. Both of the gears 105 are engaged with the corresponding gears 109, which are driven by the reversible electric motor 107 through the drive gear 108 to rotate the left hand gear 109a and the right hand gear 109b in an opposite direction as shown in the arrow marks in FIG. 17, thereby causing the cassette feeding rods 97a and 97b to be rotated in the opposite directions.

The both ends of the cassette feeding rods 97a and 97b are connected by the stay 110, the intermediate portion of the stay is linked to the drive member 112 through the link member 113. The drive member 112 is driven swigingly to and fro by the reversible electric motor 111, so that by swing motion of the electric motor 111 both of the cassette feeding rods 97a and 97b are simultaneously reciprocated with a same stroke length as the pitch between the two adjacent ribs 98 of the feeding rods 97. The length of the both of the gears 105 is so designated that each of the gears 105 and the corresponding gear 105 are always engaged together in spite of the displacement of the cassette feeding rod 97. In order to adjust the stroke of each of the cassette feeding rods 97 a pair of adjusting screws 114 are adjustably secured to a fixed member 200 with the free end of each of the screws 114 opposed to the stay 110. By this arrangement, the length of the stroke of the cassette feeding rods can be limited by abutting the stay 110 onto the rear end of the screw 114.

A limit switch 115 is disposed to detect the angular value of swing motion of the drive member 112 so that when the limit switch 115 is activated by the end of the drive member 112, the motor 111 is stopped to limit the swing angle in the backward direction.

The invention being thus described, it will be obvious that the same may be varied in many ways. Such variations are not regarded as a departure from the spirit and scope of the present invention, and all such modifications as would be obvious to one skilled in the art are intended to be included within the scope of the following claims.

What is claimed is:

1. A recording tape cassette machine for transferring tape cassettes towards a tape cassette treating machine which treats tape cassettes sequentially which comprises:
    means for receiving at least one movable magazine container having a chamber for accommodating a plurality of recording tape cassettes, each of which stands parallel in a side-by-side relationship with a vertical attitude, aligned in the same direction;
    means for discharging said tape cassettes from said magazine simultaneously; and
    a cassette transferring means which receives each of said tape cassettes from said magazine with the attitute thereof aligned in the same direction and which forwards the respective tape cassettes sequentially towards said tape cassette treating means maintaining said aligned condition.

2. A tape cassette transferring machine according to claim 1, wherein said receiving means is adapted to receive a magazine container which contains a plurality of tape cassettes aligned in one row.

3. A tape cassette transferring machine according to claim 1, wherein said magazine container has an opening on the top thereof and said discharge means comprises means for reversing the top and bottom of said magazine container for discharging the respective tape cassettes.

4. A tape cassette transferring machine according to claim 1, wherein said cassette transferring means is adapted to receive the respective tape cassettes discharge from said discharging means in such a manner that said respective tape cassettes are aligned at the same pitch as the guide ribs of said magazine container.

5. A tape cassette transferring machine according to claim 1, which further comprises a recovering means for recovering said tape cassettes discharged from said cassette treating means including a second magazine container which receives said discharged cassettes in an aligned manner.

6. A tape cassette transferring machine according to claim 5, wherein said cassette recovering means comprises at least one cassette feeding member having a plurality of ribs spaced at a predetermined pitch for supporting the respective tape cassettes and means for moving the cassette feeding member reciprocally, said cassette feeding member being movable between a supporting position for supporting said respective tape cassettes and a releasing position for releasing said respective tape cassettes from the supporting condition and also movable in a longitudinal direction of the feeding member at the same pitch of said ribs for supporting said tape cassettes in said second magazine container, whereby said moving means moves said cassette feeding member forward by one pitch supporting said respective tape cassettes to displace said tape cassettes forward then move said cassette feeding member to said releasing position, subsequently to reverse said feeding member by one pitch and then move the cassette feeding member to said supporting position in synchronism with the movement of said cassette treating machine.

7. A tape cassette transferring machine according to claim 6, wherein said cassette recovering means further comprises engaging members having ribs with a predetermined pitch for supporting said respective tape cassettes in a vertically standing condition, and means for moving said engaging members between a supporting position for supporting said tape cassettes and a releasing position for releasing said tape cassettes in synchronism with the movement of said feeding member in such a manner that when said feeding member is in a supporting position said engaging members are in a released position and when said feeding member is in a releasing position said engaging members are in a supporting position.

8. A tape cassette transferring machine according to claim 1, wherein said cassette transferring means comprises at least one cassette feeding member having a plurality of ribs spaced by a predetermined pitch for supporting said respective tape cassettes discharged from said discharging means and means for moving said cassette feeding member reciprocally, said cassette feeding member being movable between a supporting position for supporting the respective tape cassettes and a releasing position for releasing the respective tape cassettes from said supporting position and also movable in a longitudinal direction of said feeding member at the same pitch of the guide ribs for the tape cassettes in the magazine container, whereby said moving means moves said feeding member forward by one pitch supporting the respective tape cassette to displace said tape cassettes forward and then move the cassette feeding member to a releasing position, subsequently to reverse the feeding member by one pitch and then move the cassette feeding member to a supporting position.

9. A tape cassette transferring machine according to claim 8, wherein said cassette transferring means which receives said tape cassettes in said aligned vertical standing manner further comprises connecting members having ribs with a predetermined pitch for supporting said respective tape cassettes said connecting members being movable between a supporting position for supporting said tape cassettes and a releasing position for releasing said tape cassettes and means for moving said connecting members in synchronism with the movement of said feeding member in such a manner that when said feeding member is in a supporting position the connecting members are in a released position and when the feeding member is in a releasing position the connecting members are in a supporting position.

* * * * *